(12) United States Patent
Turner et al.

(10) Patent No.: US 8,336,022 B2
(45) Date of Patent: Dec. 18, 2012

(54) METHOD AND APPARATUS FOR CREATING A CONFIGURABLE BROWSER-BASED FORMS APPLICATION

(75) Inventors: Cameron Turner, Ottawa (CA); Hany Bishay, Nepean (CA)

(73) Assignee: Her Majesty the Queen in Right of Canada as Represented by the Minister of Health Through the Public Health Agency of Canada, Winnipeg (CA)

( * ) Notice: Subject to any disclaimer, the term of this patent is extended or adjusted under 35 U.S.C. 154(b) by 825 days.

(21) Appl. No.: 12/446,113

(22) PCT Filed: Oct. 22, 2007

(86) PCT No.: PCT/CA2007/001845
§ 371 (c)(1),
(2), (4) Date: Apr. 17, 2009

(87) PCT Pub. No.: WO2008/046218
PCT Pub. Date: Apr. 24, 2008

(65) Prior Publication Data
US 2010/0325601 A1    Dec. 23, 2010

Related U.S. Application Data

(60) Provisional application No. 60/862,345, filed on Oct. 20, 2006.

(51) Int. Cl.
*G06F 9/44* (2006.01)
(52) U.S. Cl. .................. 717/101; 717/107; 717/121
(58) Field of Classification Search .................. 717/101, 717/121
See application file for complete search history.

(56) References Cited

U.S. PATENT DOCUMENTS 5,263,157 A    11/1993 Janis
(Continued)

FOREIGN PATENT DOCUMENTS

WO    0106416    1/2001
(Continued)

OTHER PUBLICATIONS

Yang Yu, Display-Only File Server: A Solution against Information Theft Due to Insider Attack, 2004, ACM, 9 pages, <URL: http://delivery.acm.org/10.1145/1030000/1029154/p31-yu.pdf>.*

(Continued)

*Primary Examiner* — Thuy Dao
*Assistant Examiner* — Hua Lu
(74) *Attorney, Agent, or Firm* — Curtis B. Behman; Borden Ladner Gervais LLP

(57) ABSTRACT

A method and system are provided for implementing a configurable browser-based form application. A configurable application toolset is provided, having a plurality of reusable browser-based form application components, or shells, that are configured in response to a received set of configuration parameters. Based on the configuration parameters, the toolset can be used to create any number of browser-based form applications. The application includes a browser-based form, a database, and rules governing the collection and storage of gathered and stored data. All of the configuration parameters are stored as data, so that no recompiling or modification of compiled software code in the shells is required when changes are needed, or an entirely new browser-based form application is desired. This reduces cost and time in software development.

19 Claims, 9 Drawing Sheets

U.S. PATENT DOCUMENTS

| | | | |
|---|---|---|---|
| 6,157,936 | A | 12/2000 | Mutschler, III et al. |
| 6,298,410 | B1 | 10/2001 | Jayakumar et al. |
| 6,389,588 | B1 | 5/2002 | Wadhwa et al. |
| 6,941,471 | B2 | 9/2005 | Lin |
| 7,159,125 | B2 * | 1/2007 | Beadles et al. ............... 717/101 |
| 7,254,628 | B2 | 8/2007 | Koops et al. |
| 7,627,658 | B2 * | 12/2009 | Levett et al. ................ 717/121 |
| 2003/0154404 | A1 * | 8/2003 | Beadles et al. ............... 717/101 |
| 2003/0229522 | A1 * | 12/2003 | Thompson et al. ........... 717/107 |
| 2004/0158820 | A1 | 8/2004 | Moore et al. |
| 2004/0193912 | A1 | 9/2004 | Li et al. |
| 2005/0257196 | A1 | 11/2005 | Hollander et al. |
| 2006/0041666 | A1 | 2/2006 | Karremans |
| 2006/0149735 | A1 | 7/2006 | DeBie et al. |
| 2007/0038610 | A1 * | 2/2007 | Omoigui ....................... 717/107 |
| 2007/0156897 | A1 * | 7/2007 | Lim .............................. 717/121 |
| 2008/0066148 | A1 | 3/2008 | Lim |
| 2008/0162498 | A1 * | 7/2008 | Omoigui ....................... 717/101 |

FOREIGN PATENT DOCUMENTS

| | | |
|---|---|---|
| WO | 2006108436 A1 | 10/2006 |
| WO | 2008046277 A1 | 4/2008 |

OTHER PUBLICATIONS

Daniel Vainsencher, A Pattern Language for Extensible Program Representation, 2006, ACM, 25 pages, <URL: http://delivery.acm.org/10.1145/1420000/1415490/a15-vainsencher.pdf>.*

Gregory Ganger, Fast and Flexible Application-Level Networking on Exokernel Systems, 2002, ACM, 35 pages, <URL: http://delivery.acm.org/10.1145/510000/505455/p49-ganger.pdf>.*

Maxwell Krohn, Information Flow Control for Standard OS Abstractions, 2007, ACM, 14 pages, <URL: http://delivery.acm.org/10.1145/1300000/1294293/p321-krohn.pdf>.*

Dirk Kuhlmann, An Open Trusted Computing Architecture—Secure Virtual Machines Enabling User-Defined Policy Enforcement, 2006, Google Scholar, 16 pages, <URL: http://maswi.polito.it/doc/public/rz3655.pdf>.*

George Ma, PBSWEB: A Web-Based Interface to the Portable Batch System, 2000, Google Scholar, 7 pages, <URL: http://webdocs.cs.ualberta.ca/~paullu/Papers/pbsweb.pdcs2000.pdf>.*

PCT Patent Application No. PCT/CA2007/001845, International Search Report dated Feb. 4, 2008.

* cited by examiner

METHOD AND APPARATUS FOR CREATING A CONFIGURABLE BROWSER-BASED FORMS APPLICATION

CROSS REFERENCE TO RELATED APPLICATIONS

This application claims the benefit of priority of U.S. Provisional Patent Application No. 60/862,345 filed Oct. 20, 2006, which is incorporated herein by reference.

FIELD OF THE INVENTION

The present invention relates generally to computer software architecture and development. More particularly, the present invention relates to reusable software components, as well as the configuration of software applications.

BACKGROUND OF THE INVENTION

Computer software is used in many fields of endeavor, including public health. Typically, when a requirement for a particular software application comes to existence, this requirement is brought to a software development team and a project is undertaken. Software development is typically expensive both in terms of cost and time, since each scenario requires the development of many components specific to the particular requirements.

Object-oriented programming can help speed up software development by making available certain reusable programming objects. However, a programmer is still limited to a certain level of reusability, based on the contents of libraries of reusable objects. It is still necessary to write software code for all of the elements that will make use of the existing objects, and to rewrite that code if the requirements change.

The proliferation of internet technologies has led to an increase in the development of applications designed to run in a web browser, such as Microsoft® Internet Explorer, Mozilla Firefox, Safari, Opera and Netscape. A web browser is a software application that enables a user to display and interact with text, images, videos, music and other information, typically located on a web page at a website or on a local area network. Browser-based applications are advantageous in that they are cross-platform and can run on any operating system that can run a web browser. Many browser-based applications rely on forms for the collection, display and analysis of data, many of which have become quite sophisticated.

In known software development tools, such as ActiveX, a programmer can select tools from libraries and place them on a user interface screen for a form-based application. Resource scripting in C++ can also be used to draw a screen, and Microsoft® Access includes form generation wizards. However, these tools only assist in building screens. For example, Microsoft Access requires the separate creation of a database with which the generated form can communicate. In each of these cases, all of the communication rules and reporting mechanisms must be hard coded by a programmer. Changes in configuration result in having to modify software code and recompile the application.

Software functionality requirements typically include security requirements, or access policies. In the area of public health, such policies typically relate to the ability of different users to access different types of health data. When a software application is created, it is often necessary to also create an associated database, as well as a set of rules regarding data access and generation of reports. The integration and configuration of such components to form part of a customized solution can be very time consuming, in the order of 6 months, even if the stand-alone components already exist as a generic framework.

Known approaches, such as US 2004/0158820 and US 2005/0257196, can automatically convert a legacy application to a web-based application, or an application from one language to another. While such approaches can assist in the creation of certain portions of software, they do not provide software application tools to efficiently develop software and associated database and rules. A skilled software programmer must manually code these additional features.

It is, therefore, desirable to provide an improved software application architecture and software development approach to provide an end-to-end solution that can be easily implemented and configured to suit different needs.

SUMMARY OF THE INVENTION

It is an object of the present invention to obviate or mitigate at least one disadvantage of previous software development approaches.

In a first aspect, the present invention provides a method of creating an end-to end configurable software solution for a browser-based project. The method includes the following steps: providing an application shell, a database shell and a policy shell, the application shell having common features of browser-based forms applications; receiving configuration parameters representing project features for the browser-based project; generating a browser-based project form by customizing the common features based on the received configuration parameters, the browser-based project form having project form fields.

The method also includes: generating a project database by customizing the database shell based on the received configuration parameters, the project database having project database fields associated with the project form fields, the project database storing the configuration parameters; generating project policies by customizing the policy shell based on the received configuration parameters, the project policies governing communication between the browser-based project form and the project database; and providing the generated browser-based project form, the project database and the project policies to a user as the browser-based project.

The method can further include: receiving modified configuration parameters; and automatically regenerating the browser-based project form, the project database and the project policies based on the modified configuration parameters. Compiled software code in the application shell, the database shell and the policy shell is unchanged in response to the modified configuration parameters. The method can also include updating a user access profile in response to the received modified configuration parameters, and the step of regenerating can be based on the updated user access profile.

The method can further include: receiving second project configuration parameters; and generating a browser-based second project form, a second project database and second project policies based on the second configuration parameters. Compiled software code in the application shell, the database shell and the policy shell is unchanged in response to the second configuration parameters.

In another aspect, the present invention provides a computer-readable medium storing statements and instructions for execution by a processor to perform the method of creating an end-to end configurable software solution for a browser-based project as described above.

In a further aspect, the present invention provides a software application development system for producing a configurable browser-based forms application. The system includes an application shell, a database shell, a policy shell, a user interface, and an access control profile. The application shell has common features of browser-based forms applications. The database shell has generic database fields of browser-based forms applications. The policy shell has generic policy, data extraction and synchronization functions for browser-based forms applications. The user interface receives modifiable configuration parameters from a user.

The access control profile (ACP) stores configuration parameters and customizes the application shell, the database shell and the policy shell to create a browser-based project form, a project database and project policies, respectively. The ACP also automatically regenerates the browser-based project form, the project database and the project policies based on modification of the configuration parameters. Compiled software code in the application shell, the database shell and the policy shell is unchanged in response to modification of the configuration parameters.

The ACP can create records in a categories table in response to creation of the form, create records in a properties table in response to creation of sections of the form, and create records in an attributes table in response to creation of data fields for each section of the form. The created records provide mapping between the generic functions and the desired functions. In response to creation of organizations, groups and units in an organizational structure of the form, the ACP can create corresponding records in an organizations table, groups table and units table. In response to creation of users are within each of the units in the organizational structure, the ACP creates records in a units table and a roles table.

In response to definition of the form's access control profile for the organizational structure, the ACP can create records in an organization attributes table which point to corresponding attributes in the attributes table, and can create records in a unit attributes table which point to the created organization attributes records to maintain access control hierarchy. In response to definition of the form's access control profile for a user, the ACP can create records in a role attributes table which point to corresponding attributes in the attributes table, and can create records in a user attributes table which point to the created unit attributes table records to maintain access control hierarchy.

In a yet further aspect, the present invention provides a configurable browser-based forms application. The configurable application includes an application shell, a database shell, a policy shell, and an access control profile. The application shell has common features of browser-based forms applications. The database shell has generic database fields of browser-based forms applications. The policy shell has generic policy, data extraction and synchronization functions for browser-based forms applications. The access control profile stores configuration parameters and customizes the application shell, the database shell and the policy shell to create a browser-based project form, a project database and project policies, respectively. The ACP also automatically regenerates the browser-based project form, the project database and the project policies based on modification of the configuration parameters. Compiled software code in the application shell, the database shell and the policy shell is unchanged in response to modification of the configuration parameters.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
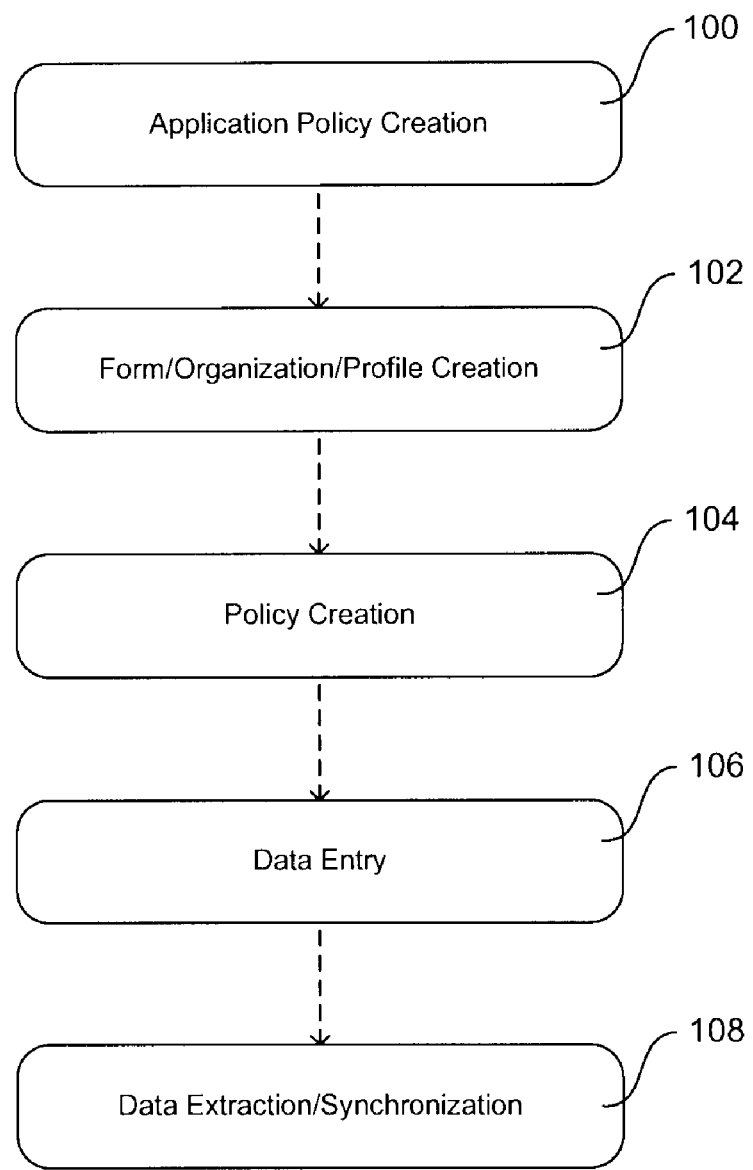
FIG. 1 is an overview of services in a configurable application according to an embodiment of the present invention.

Generally, the present invention provides a method and system for implementing a configurable browser-based form application. A configurable application toolset is provided, having a plurality of reusable browser-based form application components, or shells, that are configured in response to a received set of configuration parameters. Based on the configuration parameters, the toolset can be used to create any number of browser-based form applications. The application includes a browser-based form, a database, and rules governing the collection and storage of gathered and stored data. All of the configuration parameters are stored as data, so that no recompiling or modification of compiled software code in the shells is required when changes are needed, or an entirely new browser-based form application is desired. This reduces cost and time in software development.

A browser-based form application, or web-based form application, is an application that uses one or more forms for entering and/or accessing data. These applications are advantageous in that they are cross-platform and can run on any operating system that can run a web browser. Browser-based form applications can be developed and used in many fields such as public health information processing, inventory management, asset management, vacation scheduling, etc. A forms-based application can be as diverse as a disease surveillance application (e.g., for tuberculosis, TB), a hazardous materials inventory application, an application to manage contracts, etc. Essentially, any type of application where information can be entered in a forms-based application with different policies and different access control is an application that can be built with this process through configuration.

A database schema is a collection of meta-data that describes the relations in a database. A schema can be simply described as the "layout" of a database or the blueprint that outlines the way data is organized into tables. Schema are normally described using Structured Query Language (SQL) as a series of CREATE statements that may be used to replicate the schema in a new database.

Embodiments of the present invention take advantage of the fact that many browser-based form applications can be described, or defined, as having common attributes and features. These can be described as reusable components. Realizing that there is a demand for a wide range of form-based applications, the reusable components are then used to build a suite of tools that are completely configurable and able to be used on-the-fly to do rapid application development. For example, one tool draws configurable screens, and another tool creates the back-end structures required to store and process the data. As such, instead of taking an application out of service to add a new field based on a new requirement, a service provisioning tool can be used to add that screen without recompiling the code in the application.

Whereas some known applications allow a user to configure screens, embodiments of the present invention not only allow a user to configure screens, but also configure the access control to those screens (functions and data elements) and the policies guiding those data elements and forms. Embodiments of the present invention also permit a user to dynamically synchronize this data with a master instance of the application in a distributed environment (e.g., one central instance, others deployed on laptops that need to synch the data entered on the laptops with the central instance).

The interaction of these application shells together provides a method of application development according to an embodiment of the present invention.

Embodiments of the present invention can be advantageous for collecting data, for example, in an outbreak situation. A physician can advise of the 3 or 4 fields/screens that are important for that outbreak. The system can then be used to add the fields to an existing application, or create a new application based on those fields.

FIG. 1 provides an overview of services in a configurable application according to an embodiment of the present invention. The services and data flow are as follows: create or configure any application-based policies (step 100), e.g. all forms must be at least 5 characters. Then, create or configure a form(s), organizational structure and the access control profiles on the form for this organizational structure (step 102). The next step is to create or configure the policies for the data elements in the form and the organizational structure (step 104). These steps relate to creation of the configurable application.

A user can then enter the data into the created form(s), given the access control and policies (step 106). Finally, the data is extracted to be used in another application (e.g., SAS) or to be synchronized with a similar application on another machine (step 108). This is relevant in distributed applications, where there is a central instance of the application and distributed instances on laptops or other machines that need to synchronize their data. These steps relate to use of the configurable application.

Embodiments of the present invention take data that is typically hard-coded (forms and data elements, and their related policies) and move it from the actual software into the database. The software then works with generic data. This way, application shells can be created that contain the framework for the functionality; the details are left to be configured and stored in the database. When a form is created, the system is actually creating fields in a database. The forms themselves are not hard coded anywhere, but are simply stored to the database as data.

Typically in software development, data is only seen as information that the user enters, stores, searches on, reports, etc. According to embodiments of the present invention, an object on the screen, a field, label, user name, user profile, are all known to the system as data. Everything configurable about the application, the individuals who use it, and the rules around its operation, is stored as data. It is all stored in the Access Control Profile schema, and all communication is with respect to the schema.

Figure 2:
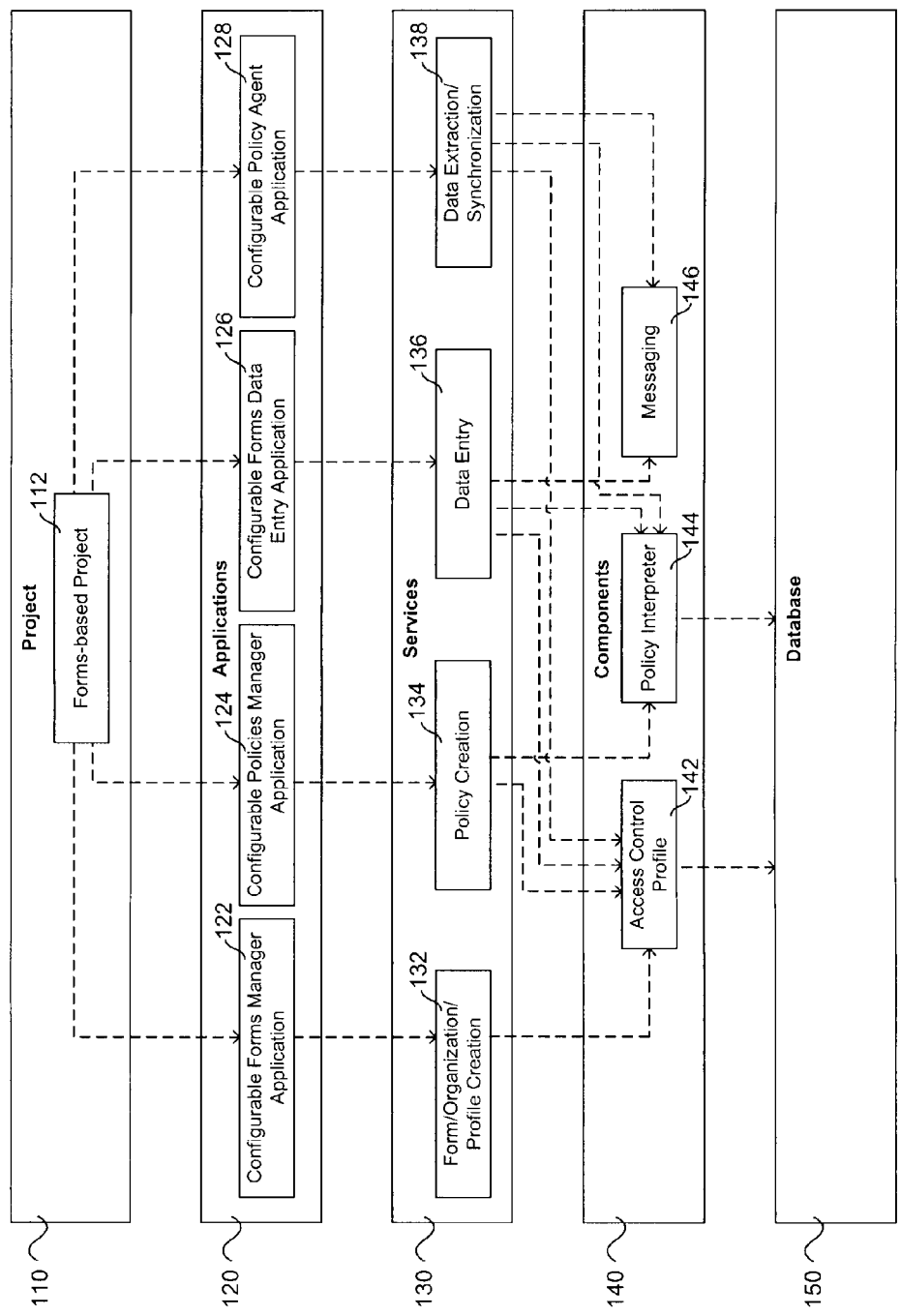
FIG. 2 illustrates a configurable application toolset architecture according to an embodiment of the present invention.

FIG. 2 illustrates a configurable application toolset architecture 100 according to an embodiment of the present invention, which shows the interaction between the different layers of the architecture for the configurable application. The architecture includes a project layer 110, an applications layer 120, a services layer 130, and a components layer 140. A database 150 is also shown, which communicates with components in the components layer 140.

The project layer 110 comprises all software that is specific to a certain project. The project layer includes a forms-based project 112. Each project will have its own specific set of components (e.g., database schema, scripts, project-specific code, property files, screens) which cannot be used by other applications. When a new project 112 is created, it will comprise the four configurable applications, which will be described below.

A project is an instantiation of a generic forms-based application where a form is configured, the policies on its data elements are configured, and the data is entered. The data is then extracted for external applications or synchronized with a similar application over the network. Therefore, the project 112 will comprise not only the application shells, the services and components but also the data stored in the database that includes all the details of the application.

The application layer 120 comprises application shells including software that is common to a browser-based form application. A Configurable Forms Manager Application 122 is provided for creating the form and structure of the application. A Configurable Policies Manager Application 124 is provided for creating the policies. A Configurable Forms Data Entry Application 126 is provided for entering the data. A Configurable Policy Agent Application 128 is provided for extracting and synchronizing the data.

The applications in the application layer 120 rely on the Components in the component layer 140 and data in the database to provide the details. Since the applications are generic for any browser-based form application, these applications can describe a disease surveillance application, an asset inventory system, a contract system, a questionnaire/survey system or a system to evaluate how certain programs or people are doing (etc.).

There are several different types of applications such as survey systems, surveillance systems and library information management systems (LIMS). The application layer 120 can also include components specific to a particular type of application. For example, survey applications would require a question server, which would not be required in a surveillance system. Furthermore, application management services (AMS) exist at this layer. These types of services include survey management (e.g., enabling, disabling surveys) and case management (e.g., enabling, disabling cases). These management services are common to different types of applications.

The services layer 130 comprises services, which are more complex, independent reusable elements. A form/organization/profile creation service 132 is used by the configurable forms manager application 122. Similarly, policy creation service 134, data entry service 136, and data extraction/synchronization service 138 are used by the configurable policies manager application 124, the configurable forms data entry application 126 and the configurable policy agent application 128, respectively. Other examples of services include a scheduler service, an adapter service, and a security service.

The services in the services layer 130 make use of, and can be composed of, components found in the component layer 140. Components in the components layer 140 are the most reused and generic components in the entire system, and include an access control profile 142, a policy interpreter 144 and a messaging component 146. The access control profile (ACP) component 142 interacts with the messaging component 146 to ensure that data is send is only the data that can be viewed. The policy interpreter component 144 interacts with the messaging component 146 to handle routing to different servers, removing data that cannot be sent for privacy reasons etc.

The component layer 140 can be described as including data store components and message components. The data store components interact with the data stores such as databases and directories. There are different procedures for accessing data residing in data stores. For instance, one application may want to use a resource-managed database class whereas another application may want to make use of table-based database classes. Other components may want to offer direct services to these components. With respect to message components, there are many different ways that components can communicate with each other. A common method is via a Message-Oriented Middleware (MOM) such as SOAP or JMS. However, Remote Procedure Call-based technologies such as CORBA and RMI provide alternative solutions.

The database 150 sits underneath the component layer. Most database access goes through the ACP component 142. The policy interpreter 144 stores and retrieves the policies from the database 150 and also acts upon data stored in the database. The messaging component 146 does not generally use the database since it is mostly concerned with building and sending XML/SOAP messages. A data synchronization service, which uses all of the components, accesses the database through the ACP component 142 and policy interpreter 144.

Form Management

The access control profile schema is at the heart of all configurable applications according to embodiments of the present invention, and is what provides the data flexibility for the configurable applications.

Figure 3:
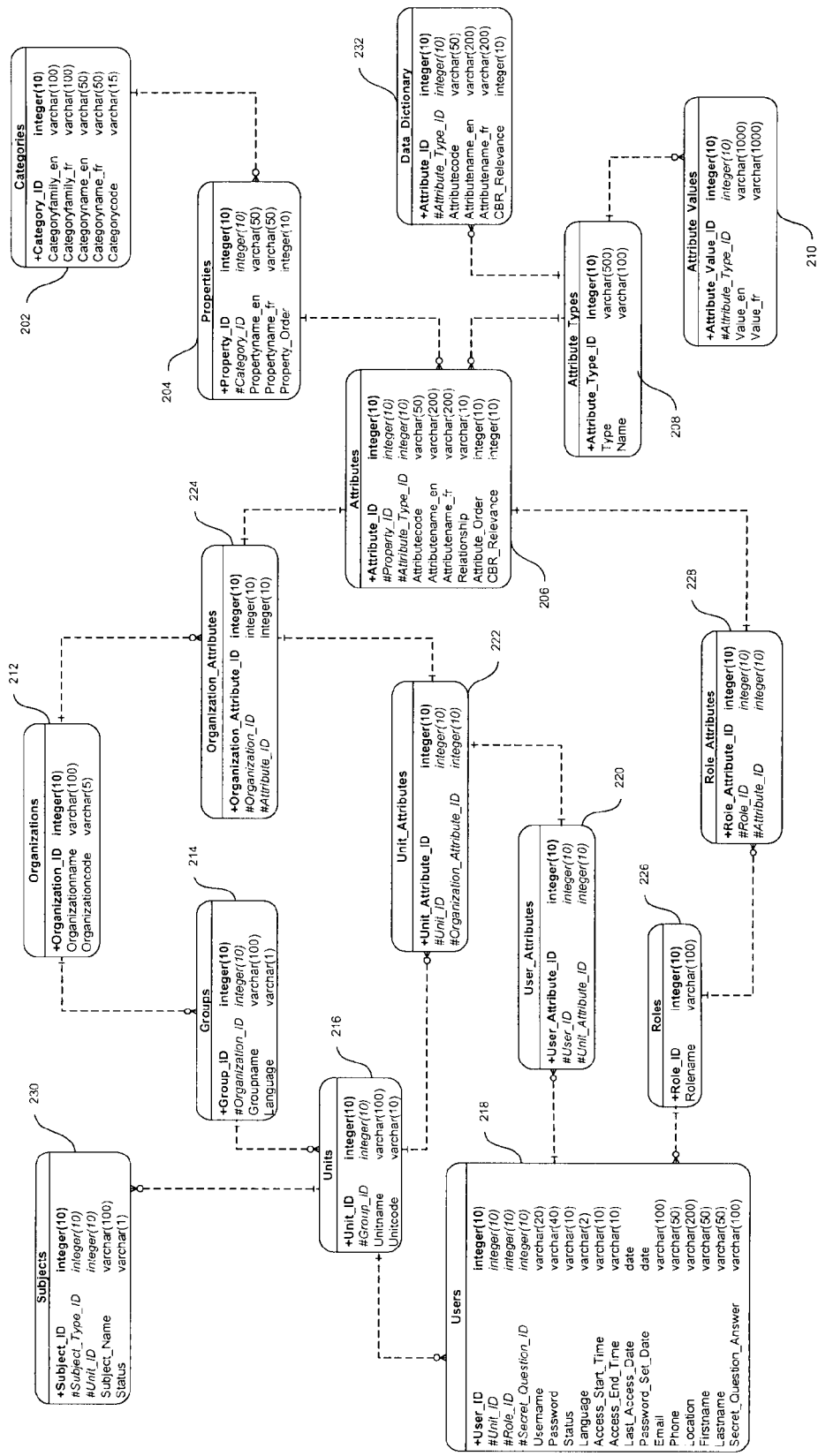
FIG. 3 illustrates an access control profile schema for a configurable forms manager application according to an embodiment of the present invention.

FIG. 3 illustrates an access control profile schema 200 for a configurable forms manager application 122 according to an embodiment of the present invention. Forms are stored in the categories table 202. Sections in the forms are stored in the properties table 204. The data elements for each section of the form are stored in the attributes table 206. The data types (e.g., dropdown list) that can be assigned to each data element are stored in the attribute types table 208, with their values (e.g., values in a dropdown list) being stored in the attribute values table 210.

Organizational structure is stored in the organizations table 212, groups table 214, units table 216, and users table 218. The Access Control Profile is stored in the user attributes table 220, unit attributes table 222 and organization attributes table 224.

Other tables of note are the roles table 226 and the role attributes table 228. Each user is assigned a Role that determines what functions of the application the user can access. Note that role attributes table 226 has a relationship with the attributes table 206. This is because a function within the configurable application is treated no differently than a data element. The category could be the functions (e.g., TB Functions) for the application, the property could be the different web pages in the application for that function (e.g., User Management) and the Attributes would be the functions themselves (e.g., Create a User, Create a Role). Further tables of note are a subjects table 230 and a data dictionary table 232.

Therefore, access to a function in a configurable application according to an embodiment of the present invention can be controlled within the application in a similar manner as controlling access to forms, sections in those forms, and data elements in those sections. This is enabled by considering everything outside of the application shells as a piece of data. Every object seen on a form on the screen is stored as data.

Figure 4:
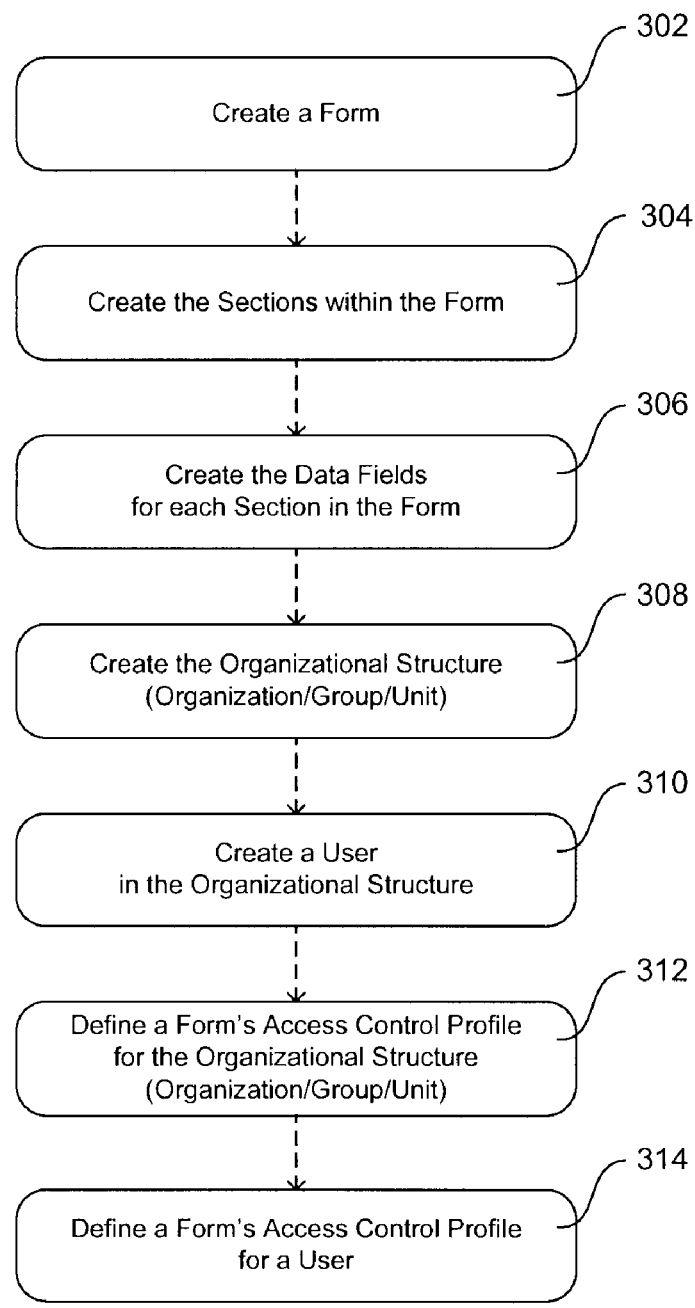
FIG. 4 illustrates a services data flow in the configurable forms manager application according to an embodiment of the present invention.

FIG. 4 illustrates a services data flow according to an embodiment of the present invention in a configurable forms manager application 122, such as the Form/Organization/Profile Creation Service in FIG. 1. These steps will also be described in relation to the involvement of the access control profile (ACP) with each step.

In step 302, a form is created, for example a form that will track TB cases. When the form is created, the ACP creates the necessary records in the categories table. Next, in step 304, the sections within this form are created, in response to which the ACP creates the necessary records in the properties table. The section can be patient information, physician information, etc. Next, in step 306, the data fields for each section within the form are created, e.g. date of submission, physician name. In response to this step, the ACP creates the necessary records in the attributes table, assigning a type from the attribute types table.

Once the form is complete, the organizational structure can be defined. In step 308, the organizations, groups within those organizations and units within those groups are defined in a hierarchy. For example, an organization (Province) may contain Health Regions (groups) which contain laboratories (units). Another application may define the organization to be the institution (Federal Government) with Departments (groups) and Branches (units). The ACP creates the necessary records in the organizations, groups and units tables, respectively. In step 310, users are then created within each of these units in the organizational structure, in response to which the ACP creates the necessary records in the units and roles tables.

In step 312, a form's access control profile is defined for the organizational structure by creating the necessary records in the organization attributes and unit attributes tables. The values in the organization attributes table points to the attributes in the attributes table. The values in the unit attributes table point to the values in the organization attributes table to maintain the access control hierarchy. In step 314, a form's access control profile is defined for a user by creating the necessary records in the user attributes and role attributes table. The values in the role attributes table points to the attributes in the attributes table (functions, stored as data). The values in the user attributes table point to the values in the unit attributes table to maintain the access control hierarchy. There is no hierarchy to maintain for the roles.

Based on the access control profile, one Organization may have access to all Forms whereas another Organization may only have access to one Form. Likewise, a Health Region may have access to certain Sections within a Form completely different from another Health Region. Likewise, one User may have access to all elements within a Form whereas another User may have only partial access. Since the Access Control is hierarchical, the Access Control pushes downward. Therefore, if an Organization is not granted access to a Form, then all Groups/Units/Users within that Organization will not have access to that Form. Likewise, if an Organization has access to all the forms, but a Unit does not, then all users within that Unit will not have access whereas users within another Unit will have access.

Data Entry

Figure 5:
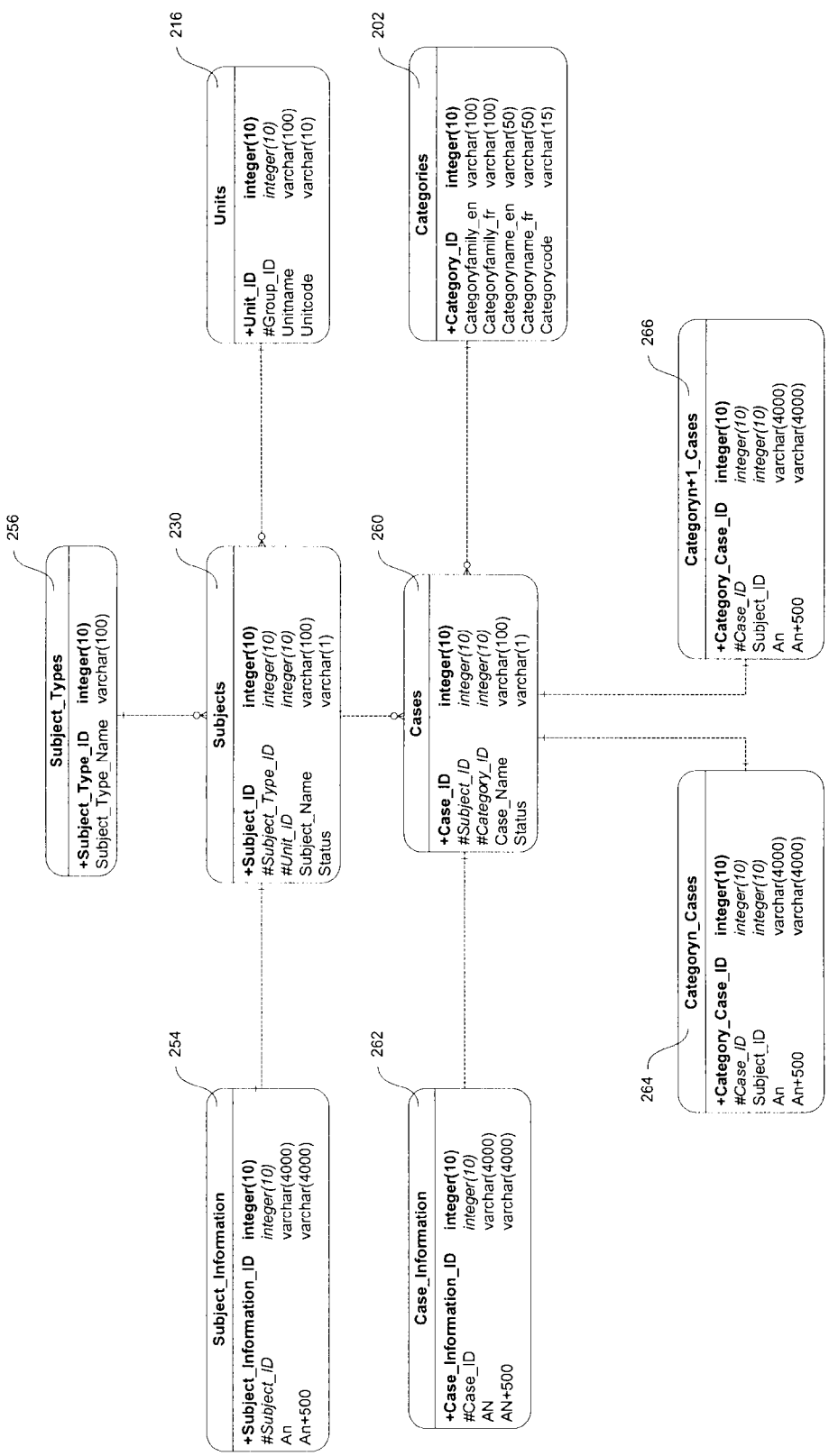
FIG. 5 illustrates an access control profile schema for a configurable forms data entry application according to an embodiment of the present invention.

FIG. 5 illustrates an Access Control Profile Schema 250 for a configurable forms data entry application 126 according to an embodiment of the present invention. This part of the schema, also referred to as a service provisioning schema, handles the actual data entry part. The units table 216, the subjects table 230 and the categories table 202 are the same as the corresponding tables in FIG. 3, with FIG. 5 providing a magnification of the associations of the subjects table 230.

Any form-based application can be defined as having a concept of Subject and Case. These terms are used generically. For instance, a Subject in a contractor application would be the Contractor themselves with the Cases being each contract they work on. A Subject in a TB application would be the patient and the Cases would be the different records that are kept about them in regards to TB. Similarly, an inventory application may define a Subject as an institution with the Cases being the different assets they contain.

In each of these cases, the Subjects and the Cases are both forms. In other words, what a subject contains (sections and data elements) and what a particular case contains (sections and data elements) are all configured as forms. Referring to FIG. 5, subject information is stored in the subjects table 230, a subject information table 234, a subject types table 236, and the units table 216. Case information is stored in a cases table 238, a case information table 240, a category n cases table 242, and a category n+1 cases table 244.

In an alternate embodiment, an application does not have the concept of a subject. In that scenario, the application will just have cases (whatever they may be) and the above framework can handle that as well.

Figure 6:
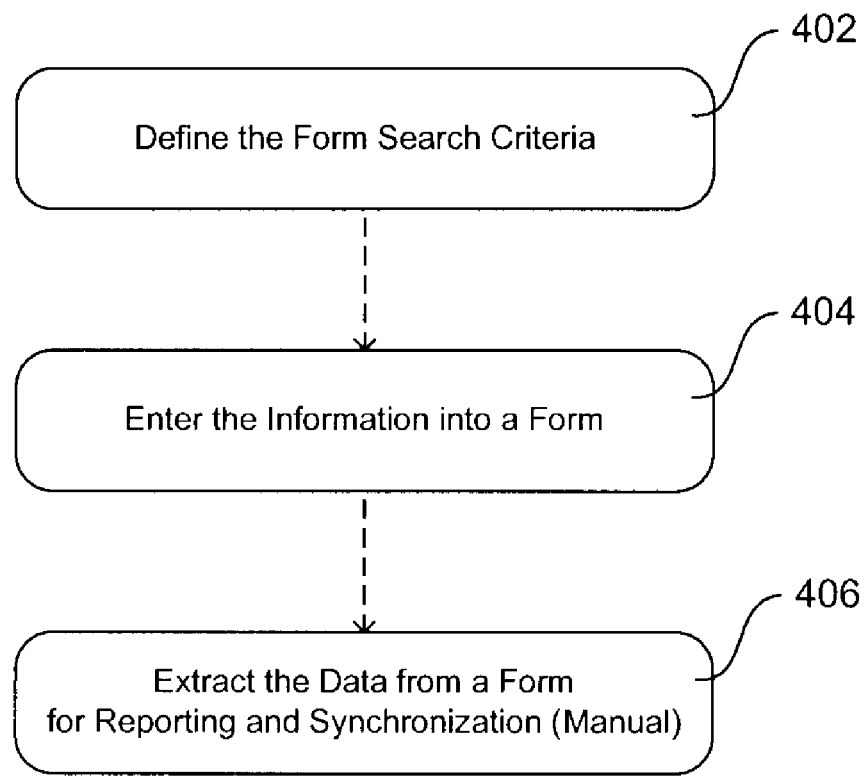
FIG. 6 illustrates a services data flow in a configurable forms data entry application according to an embodiment of the present invention.

FIG. 6 illustrates a services data flow according to an embodiment of the present invention in a configurable forms data entry application 126, such as the Services Data Flow from the Data Entry Service from FIG. 1. These steps will also be described in relation to the involvement of the access control profile (ACP) with each step.

The first service that occurs in step 402 is where a user defines the form search criteria. Based on their access, a user will select the data elements from a form that they wish to search on. Their criteria and the data elements that will be displayed in a line list. Therefore, the user can create many different types of ad hoc reporting/analysis with this system. In response to the user defining the form search criteria in step 402, the ACP provides the profile information to give access to the forms, sections and data elements that the user is permitted to see when building the various ad hoc searching functions.

The next service occurs once a list of forms is returned from the search. In step 404, the user enters the information into the form. This is the actual data entry process. In response to step 404, the ACP provides the profile information to give access to only those forms, sections and data elements that the user is permitted to see when entering or viewing data. After the user has entered this data, the record is saved, pending any policy violations, triggers and workflow as defined by the policies outlined in FIG. 3, which will be described later.

Finally, in step 406, the user can extract the data that they have entered for use in another application such as SAS. Also, the user can synchronize the records they have entered with the central instance of the application. In response to step 406, the ACP provides the profile information to access only those forms, sections and data elements that the user is permitted to see when extracting or reporting on the data.

Data Objects

The configuration for an application is detailed as data in the above schema, with some in the Policy Interpreter schema, which will be described below. This is what makes these applications so adaptable to be used in any form-based application—the details are configured, not hard-coded.

Typically, forms-based applications are hard-coded in that the fields shown on a data entry screen have similar database fields behind them. In embodiments of the present invention, all of the fields and definitions are stored in the Categories/ Properties/Attributes/Attribute_Types/Attribute_Values tables. Each attribute has an ID and this ID maps directly to the id in the Subject_Information, Case_Information and Categoryn_Cases tables. When considering the field 'An' in these tables, the 'n' refers to the attribute ID in the Attributes table. Therefore, if a field 'Date of Submission' was created as part of the 'Create Forms' Service and was assigned ID 55 in the Attributes table, then in the Category1_Cases table (which contains IDs 1-500), field A55 would refer to this 'Date of Submission'.

Therefore, instead of having a hard-coded field on the screen and a similar field in the database, the data is modeled in a very generic way: 'Attribute 55 points to A55 in Category1_Cases'. This allows the Attributes (Data Fields) to be defined as any data field. In one application, attribute A55 may be 'Name of Contact'; in another application, it may be 'Experienced Symptoms'. From a software code perspective, none of this is hard-coded. The software will not include a 'Date of Submission', 'Name of Contact' or 'Experienced Symptoms' field. This information is part of the configuration parameters, and therefore only exists in the database (Attributes table and Policy tables). Instead, in an application according to an embodiment of the present invention, for the case of 'Date of Submission', the database includes 'A55=2007/01/01' and for the case of 'Name of Contact', the database includes 'A55=Cameron Turner'.

The Access Control Profile (ACP) provides the mapping necessary between a name and an ID. When a user logs into the application, a profile is built and stored in memory for them. The profile houses all of the Access Control information configured by the Configurable Forms Manager Application. This can be defined as all Forms, Sections and Data Elements that the user is permitted to see, along with all of the Functions within the application that the user can see. Therefore, a user will never be able to see/enter data for/extract data from any Form, Section or Data Element that was not configured for them in the Configurable Forms Manager Application. Every time a user logs in, the profile is built for them. Therefore, if an update was made in the Configurable Forms Manager Application (e.g., now giving access to a number of fields in the TB form), the user will get this updated profile the next time he/she logs in.

Each time a form is created, another table is created (either Subject_Information, Case_Information or Categoryn_ Cases, where n is the ID of the Form—each of these tables is similar). In this table and the Attributes table, the next available 500 attributes are set aside for this Form (e.g., 1-500, 501-1000, 1001-1500 etc.), similar to reserving addresses when declaring variables in memory (especially like an Array List where it sets aside a range of values in memory). Therefore, when creating an attribute for Form 3, the first Attribute ID that will be used for this Form in the Attributes table is 1001 and this will map to field 'A1001' in Category3_Cases (or Subject_Information or Case_Information if the information is for a Subject or common to all Cases in the system).

The Access Control Profile will handle storing this mapping in the database schema when creating these Forms and Attributes. When a user logs in and their personal profile is built, the Access Control Profile Component is the interface for other classes in the application to use when requiring access to the attributes. Therefore, this can be described as using a pointer in a compiled software application, rather than in code.

When a user's personal Access Control Profile is built when the user logs in, the database schema is read for that user and all the attributes, their names, IDs, types etc. are retrieved from the database and stored in a set of Hashtables internal to the Access Control Profile. Therefore, these Hashtables store the mappings and the various Access Control Profile methods use these Hashtables to provide the information to other parts of the application that need it.

For example, a part of the Data Entry Service that may be responsible for the back-end work of drawing a Form screen may call the method 'getAttributeIDsByCategory' where it returns all Attribute IDs to which the user has access for a particular Form. Then it may use this list of IDs and call a method back on the Access Control Profile, 'getAttributeNames', to get the list of all Attribute Names for the Form to which this user has access. Then it may call the method 'getAttributeType' for a particular ID to get the type so it knows what to draw on the screen (e.g., a text box, date field, grid etc.). In this way, the Data Entry Service does all its work through the Access Control Profile.

Each service (form configurer, service provisioner, policy manager) has its own tables. Each service communicates within the database. The messages are passed back and forth between two services based on the data that is collected by those services. Those tables are separate from the data model of the application.

A first profile schema (like a library) is used to create the form. That profile includes fields, data types, drop down lists, etc. When the form is created, the form has its own unique schema that the profiler (and other services) can use.

All of the functions, access rights, and usability of the application tie back to the stored schema. All of the other services communicate with, add to, and use that architectural schema. All of the services of the architecture are implemented together; they are in constant communication with each other through agents to verify things.

Once a form (record) is created, it is saved to the database, and is then accessible to the rest of the application. Most of the application is saved in the database. For example, for a search, the searches can be saved to the database. The actual search functionality of an application is not hard coded for an application, but is rather retrieved from the database. The back end components enable this. The application is not being hard coded—it is being configured.

Policy Interpreter

Figure 7:
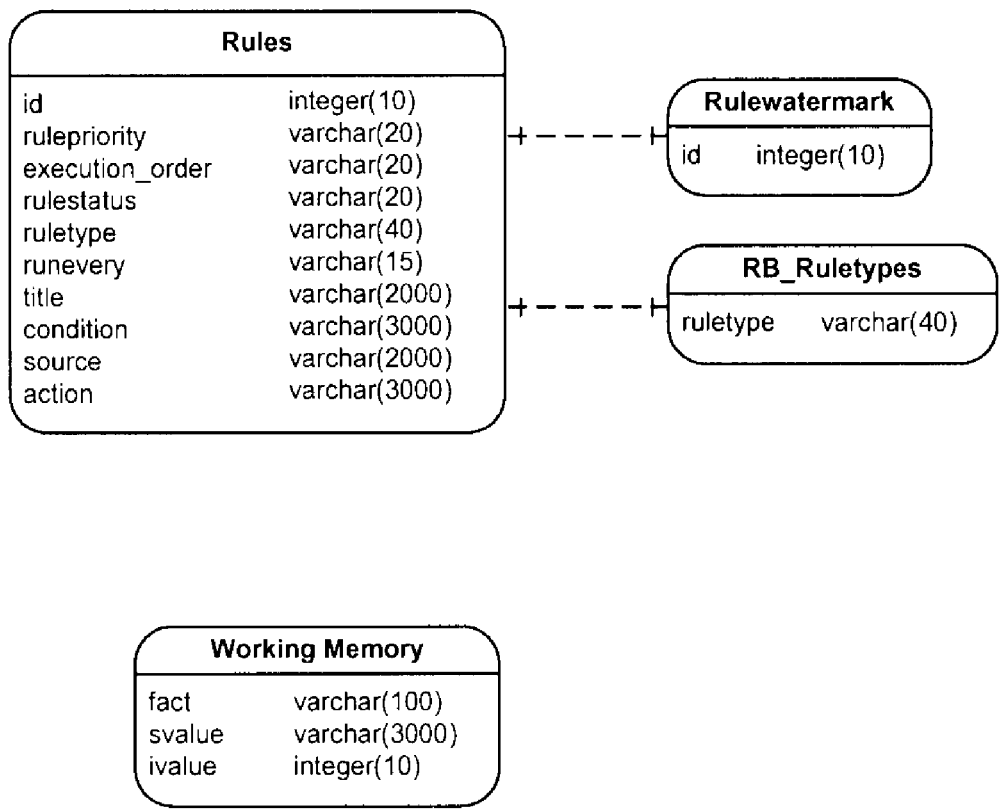
FIG. 7 illustrates a policy interpreter schema for a configurable policies manager application according to an embodiment of the present invention.

FIG. 7 illustrates a policy interpreter schema for a configurable policies manager application 124 according to an embodiment of the present invention. Policies can be used at any time within the configurable forms manager application. Policies can be used in this application to: restrict names of forms and data elements, provide password policy standards, etc. Policies can also be configured for the configurable policies manager application itself to ensure data quality in the policies, themselves. For example, a policy can add notifications if an unauthorized person creates policies after-hours, ensure that all policies created have all the mandatory fields etc.

The data model for the entity-relationship diagram in FIG. 7 is described below. Each table is outlined along with their field names, types etc.

TABLE 1

| Table RULES | | | | |
|---|---|---|---|---|
| Field Name | Description | Type | Keys | Null |
| ID | Unique identifier of a rule in the system. | NUMBER | PK | No |
| RulePriority | General priority of the rule (1-5). Priority 1 rules are executed first, Priority 2 rules are executed next etc. | VARCHAR2 (20) | | No |
| Execution_Order | Secondary priority of the rule (100-120). Execution Order 100 of a Rule Priority 1 is executed first. An Execution Order of 120 in Rule Priority 5 is executed last. | VARCHAR2 (20) | | No |
| RuleStatus | Active or Inactive. Only Active rules are tested. | VARCHAR2 (20) | | No |
| RuleType | Rule classification for organization and understanding purposes. | VARCHAR2 (40) | | No |
| RunEvery | Determines frequency of rule execution. | VARCHAR2 (15) | | No |
| Title | Description of rule. | VARCHAR2 (80) | | No |
| Condition | Condition rule must satisfy. | VARCHAR2 (3000) | | No |
| Source | Tables which contain the data on which conditions will be analyzed. | VARCHAR2 (2000) | | No |
| Action | Action to take if condition passes. | VARCHAR2 (3000) | | No |

TABLE 2

| Table RULEWATERMARK | | | | |
|---|---|---|---|---|
| Field Name | Description | Type | Keys | Null |
| ID | Unique identifier of the next rule to be created in the system. | NUMBER | PK | No |

TABLE 3

Table WORKING_MEMORY

| Field Name | Description | Type | Keys | Null |
|---|---|---|---|---|
| Fact | Identifier of a fact in the knowledge base. | VARCHAR2 (100) | | No |
| Svalue | String value of the fact. | VARCHAR2 (100) | | Yes |
| Ivalue | Integer value of the fact. | NUMBER | | Yes |

TABLE 4

Table RB_RULETYPES

| Field Name | Description | Type | Keys | Null |
|---|---|---|---|---|
| RuleType | Rule classification for organization and understanding purposes. | VARCHAR2 (40) | PK | No |

Figure 8:
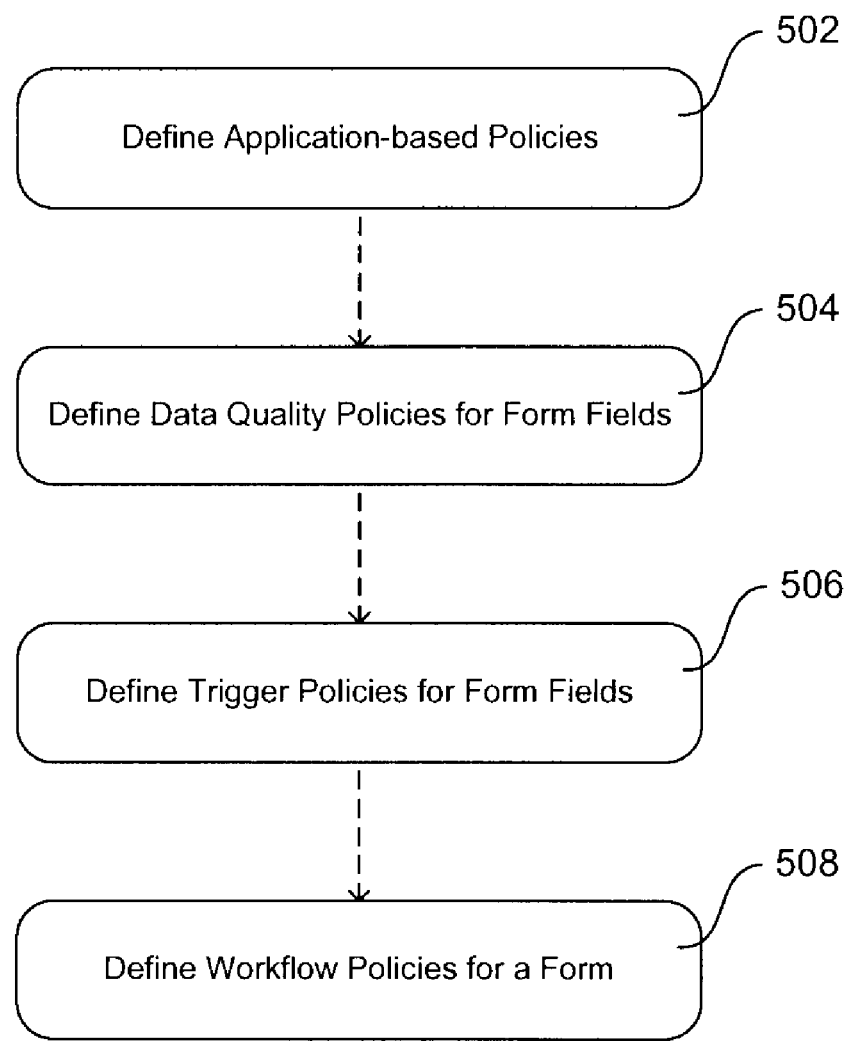
FIG. 8 illustrates a policies data flow in a configurable policies manager application according to an embodiment of the present invention.

FIG. 8 illustrates policies data flow according to an embodiment of the present invention in a configurable policies manager application 128, such as the Application Policy Creation and Policy Creation Services from FIG. 1. These policies will be placed on elements within the form and elements created in the application.

Application-based Policies can be defined in step 502 to control the policies surrounding creating all the different elements within the application. For instance, there may be policies to state that a form must start with the characters 'APP-.', or a user cannot be named 'Super', or an organization, defined as a province or territory, must be from an acceptable list of provinces and territories.

Data Quality Policies can be defined in step 504 to control data formats (dates can only have certain fields), data existence (mandatory fields that are necessary to fill out) and data interactions (if one field is entered then another field must be entered etc.). Also, policies can be in place to ensure that only one form of a certain type of disease is entered as well as to ensure that only one user can be looking at a form at a time.

Trigger Policies can be defined in step 506 to control actions based on information in a data field (e.g., email an administrator if a certain disease outcome is noted or if this is the nth time a patient has complained of a particular symptom).

Workflow Policies for a form can be defined in step 508 to control what actions are to occur after a form is filled out. For instance, it may be to move a state data field (e.g., from data entered to waiting for approval). It may also include notifying another user by email that it is their turn to go into the form and do something.

The Policy Interpreter interacts with the following services in the configurable forms data entry application steps in FIG. 4: enter the information into a form (step 402): most of the policies created in the configurable policies manager application, as defined in FIG. 3, are created for this application (data quality validation, triggers, workflow etc.); and extract the data from a form for reporting and synchronization (step 406): policies can be used to remove certain data from being reported/synchronized, route the information to different places or provide additional information to what is being reported.

Figure 9:
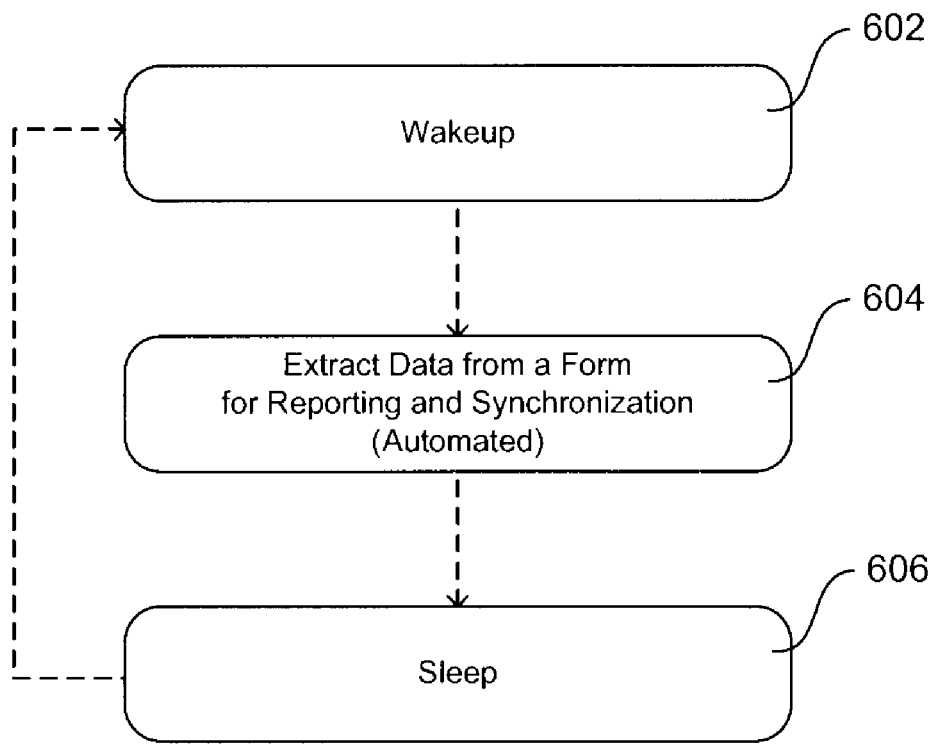
FIG. 9 illustrates a process within a configurable policy agent application according to an embodiment of the present invention.

FIG. 9 illustrates a process according to an embodiment of the present invention within a configurable policy agent application 128, such as the Data Extraction/Synchronization Service from FIG. 1.

The Policy Agent will wakeup in step 602, get the extraction and synchronization policies and perform the extraction and synchronization actions in step 604 as needed. The Policy Agent will then return to sleep in step 606 until the start of the next cycle. The data that can be extracted and synchronized is once again based on the Access Control Profile and the Policies.

The Agent can also handle data trigger policies based on information it sees in the database. Therefore, a policy could be created to look for a threshold of records that exhibit the same symptoms. The Agent, when waking up, can check for this policy and take the prescribed course of action if the policy is violated.

A policy interpreter, policy service, policy shell or other policy components can be implemented as discussed in the co-pending and commonly assigned International Patent Application No. PCT/CA2007/001860 filed on Oct. 22, 2007 and entitled "Method And Apparatus For Software Policy Management", which is incorporated herein by reference. The policy manager as discussed therein can be provided as a policy manager service, which can be part of an application shell, to produce a browser-based project. A configurable browser-based form application can be described as a policy-enabled application.

Messaging Component

The Messaging Component is a framework used to send and receive information between a master instance of an application and distributed instances of the application. In many instances, there is a time where an instance of the Configurable Application must be deployed onto a laptop to be used in an offline or standalone manner. The data within this application must then be synched up to the master instance.

However, because the Messaging Component sends messages using SOAP/XML, the Messaging Component allows an application to communicate with an external application that is setup to handle messaging such as HL-7 through Web Services.

The Messaging Component does not have its own schema. It uses the information in the Access Control Profile and the policies are retrieved from the Policy Interpreter schema.

Embodiments of the present invention provide the benefit of the use of a consistent and secure software architecture, which reduces risk associated with maintaining multiple platforms and technologies by adopting the use of a component based architecture.

Development costs can be reduced by the increased development of common components. For example, 3 years ago, the average cost of a Surveillance application was $250,000 this has been reduced to $25,000 using embodiments of the present invention. Increased reuse provides consolidation of development tools and lowered licensing costs.

Support costs can be reduced, since all IT staff are supporting the same platform—all applications are the same—with differences in the configurable portion. This results in decreased training costs and lower dependency on diverse specialized skills.

Productivity can be increased. Application development time can be reduced. Three years ago, average development time of a Surveillance application was 18 months; this has been reduced to 3 months using embodiments of the present invention.

Increased preparedness is another advantage. Public health agencies need to be prepared for emerging pathogens. Embodiments of the present invention allow them to respond to an emergency outbreak situation with a configurable application within hours or days, depending on the complexity.

Embodiments of the present invention can be applied to frame based applications if a certain API or platform is selected. An entire framework is then built, and instead of having the services separate, there would be a unified application wizard.

A user interface can be provided to improve usability of embodiments of the present invention. A user interface for a service provisioner can have templates of software. For example, a surveillance application is desired, the relevant fields (subject information, case information) are provided for completion and customization.

Drag and drop functionality can also be provided. When a user creates the form, the system can provide a form screens that is re-drawn based on the information in the profile schema. By default, a "grid" can be created in the screen, and the system it assigns the defined fields somewhere in the grid. Attributes can be set up in a data dictionary table 232 such as shown in FIG. 3, to provide pre-set field names, that are modifiable. Advantageously, the system includes a drag and drop user interface by which the user can drag and drop the fields where they want them to appear on the screen. Various methods of manipulating a screen are known on Facebook, Google and other websites using Web 2.0, to allow users to customize where information is displayed on the screen. Any suitable method can be used.

An entire organization could run a plurality of forms-based applications using one set of application shells according to an embodiment of the present invention. A profiler would manage policies and permissions for every user within the organization, and completely manage what the users see on the screen. The plurality of forms-based applications can include, for example: asset management applications, surveillance applications, human resource applications, meeting room manager applications, vacation scheduling applications. All applications reports back into a central schema.

An advantage is that because only data is used for customization, systems management is streamlined. Managing 20 applications is far more difficult than managing one application. Support costs can be reduced dramatically, since there is no need for having a separate tech support person being a subject matter expert for each particular application to be supported. For example, an IT department could have 4 full-time support staff managing over 60 applications, because they're all the same on the "back end". Using embodiments of the present invention, instead of taking a year to build a browser-based form application, it can take 2½-3 months.

In another application, the messaging service has been enhanced to allow synchronization, so that a health worker can take a tablet PC and synchronize it like a PalmPilot™. The message server communicates with the profiler to determine what the user has access to, and which screens they can see. On top of all that, it figures out if the data in the central instance is more recent than the mobile (off-site) instance; if they are, it merges them.

In the above description, for purposes of explanation, numerous details have been set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A method of creating an end-to end configurable browser-based software project, comprising:
   providing an application shell, a database shell and a policy shell, the application shell having compiled software code providing common features of browser-based forms applications, the database shell having compiled software code providing generic database fields of browser-based forms applications, the policy shell having compiled software code providing generic policy functions, generic data extraction functions and generic synchronization functions for browser-based forms applications;
   receiving configuration parameters representing project features for the browser-based project;
   generating a browser-based project form by customizing the common features in the application shell based on the received configuration parameters such that compiled software code in the application shell is unmodified, the browser-based project form having project form fields;
   generating a project database by customizing the database shell based on the received configuration parameters such that compiled software code in the database shell is unmodified, the project database having project database fields associated with the project form fields, the project database storing the configuration parameters;
   generating project policies by customizing the policy shell based on the received configuration parameters such that compiled software code in the database shell is unmodified, the project policies governing communication between the browser-based project form and the project database; and
   providing the generated browser-based project form, the project database and the project policies to a user as the browser-based project.

2. The method of claim 1 further comprising:
   receiving modified configuration parameters; and
   automatically regenerating the browser-based project form, the project database and the project policies based on the modified configuration parameters, wherein compiled software code in the application shell, the database shell and the policy shell is unchanged in response to the modified configuration parameters.

3. The method of claim 2 further comprising:
    updating a user access profile in response to the received modified configuration parameters,
    wherein the step of regenerating is based on the updated user access profile.

4. The method of claim 1 further comprising:
    receiving second project configuration parameters; and
    generating a browser-based second project form, a second project database and second project policies based on the second configuration parameters, wherein compiled software code in the application shell, the database shell and the policy shell is unchanged in response to the second configuration parameters.

5. A non-transitory computer-readable medium storing statements and instructions for execution by a processor to perform a method of creating an end-to end configurable software solution for a browser-based project, the method including:
    providing an application shell, a database shell and a policy shell, the application shell having compiled software code providing common features of browser-based forms applications, the database shell having compiled software code providing generic database fields of browser-based forms applications, the policy shell having compiled software code providing generic policy functions, generic data extraction functions and generic synchronization functions for browser-based forms applications;
    receiving configuration parameters representing project features for the browser-based project;
    generating a browser-based project form by customizing the common features in the application shell based on the received configuration parameters such that compiled software code in the application shell is unmodified, the browser-based project form having project form fields;
    generating a project database by customizing the database shell based on the received configuration parameters such that compiled software code in the database shell is unmodified, the project database having project database fields associated with the project form fields, the project database storing the configuration parameters;
    generating project policies by customizing the policy shell based on the received configuration parameters such that compiled software code in the database shell is unmodified, the project policies governing communication between the browser-based project form and the project database; and
    providing the generated browser-based project form, the project database and the project policies to a user as the browser-based project.

6. The computer-readable medium of claim 5 wherein the method further comprises:
    receiving modified configuration parameters; and
    automatically regenerating the browser-based project form, the project database and the project policies based on the modified configuration parameters, wherein compiled software code in the application shell, the database shell and the policy shell is unchanged in response to the modified configuration parameters.

7. The computer-readable medium of claim 6 wherein the method further comprises:
    updating a user access profile in response to the received modified configuration parameters,
    wherein the step of regenerating is based on the updated user access profile.

8. The computer-readable medium of claim 5 wherein the method further comprises:
    receiving second project configuration parameters; and
    generating a browser-based second project form, a second project database and second project policies based on the second configuration parameters, wherein compiled software code in the application shell, the database shell and the policy shell is unchanged in response to the second configuration parameters.

9. A software application development system for producing a configurable browser-based forms application, comprising:
    a non-transitory computer readable medium having stored thereon:
    an application shell having compiled software code providing common features of browser-based forms applications;
    a database shell having compiled software code providing generic database fields of browser-based forms applications;
    a policy shell having compiled software code providing generic policy functions, generic data extraction functions and generic synchronization functions for browser-based forms applications;
    an access control profile (ACP) to receive and store configuration parameters and configurable portions of the configurable browser-based forms application; and
    a processor configured to, in conjunction with the ACP, customize the application shell, to create a browser-based project form, and to automatically regenerate the browser-based project form, based on received modifiable configuration parameters, customize the database shell to create a project database and to automatically regenerate the project database based on the received modifiable configuration parameters, and customize the policy shell to create project policies and to automatically regenerate the project policies based on the received modifiable configuration parameters, wherein the compiled software code in the application shell, the database shell and the policy shell is unchanged by the configuration parameters.

10. The software application development system of claim 9 further comprising a user interface to receive the configuration parameters from a user.

11. The software application development system of claim 9 wherein the ACP automatically regenerates the browser-based project form, the project database and the project policies based on modification of the configuration parameters, and wherein the compiled software code in the application shell, the database shell and the policy shell is unchanged in response to modification of the configuration parameters.

12. The software application development system of claim 9 wherein the configuration parameters are stored as data in tables in the access control profile.

13. The software application development system of claim 9 wherein the ACP creates records in a categories table in response to creation of the form, creates records in a properties table in response to creation of sections of the form, and creates records in an attributes table in response to creation of data fields for each section of the form, the created records providing mapping between the generic functions and the desired functions.

14. The software application development system of claim 9 wherein the ACP creates records in an organizations table, groups table and units table in response to received data relating to creation of organizations, groups and units in an organizational structure of the form.

15. The software application development system of claim 14 wherein the ACP creates records in a units table and a roles table in response to received data relating to creation of users within each of the units.

16. The software application development system of claim 14 wherein, in response to definition of the form's access control profile for the organizational structure, the ACP creates records in an organization attributes table which point to corresponding attributes in the attributes table, and creates records in a unit attributes table which point to the created organization attributes records to maintain access control hierarchy.

17. The software application development system of claim 16 wherein, in response to definition of the form's access control profile for a user, the ACP creates records in a role attributes table which point to corresponding attributes in the attributes table, and creates records in a user attributes table which point to the created unit attributes table records to maintain access control hierarchy.

18. The software application development system of claim 9 further comprising a messaging component to communicate messages between different instances of the application.

19. The software application development system of claim 18 wherein the messaging component sends and receives information between a master instance of the application and distributed instances of the application.

* * * * *